United States Patent
Ballow et al.

(10) Patent No.: US 9,984,434 B1
(45) Date of Patent: May 29, 2018

(54) TECHNIQUES TO DERIVE EFFICIENT CONVERSION AND/OR COLOR CORRECTION OF VIDEO DATA

(71) Applicant: Apple Inc., Cupertino, CA (US)

(72) Inventors: Aaron M. Ballow, San Jose, CA (US); Kenneth I. Greenebaum, San Carlos, CA (US)

(73) Assignee: APPLE INC., Cupertino, CA (US)

( * ) Notice: Subject to any disclaimer, the term of this patent is extended or adjusted under 35 U.S.C. 154(b) by 0 days. days.

(21) Appl. No.: 15/274,960

(22) Filed: Sep. 23, 2016

(51) Int. Cl.
*G06T 1/20* (2006.01)
*G06F 9/38* (2018.01)

(52) U.S. Cl.
CPC .............. *G06T 1/20* (2013.01); *G06F 9/3867* (2013.01); *G06F 9/3873* (2013.01)

(58) Field of Classification Search
None
See application file for complete search history.

(56) References Cited

U.S. PATENT DOCUMENTS

| | | | | |
|---|---|---|---|---|
| 5,778,250 A | * | 7/1998 | Dye | ...................... G06F 9/3004 712/32 |
| 7,822,270 B2 | | 10/2010 | Van Hoof et al. | |
| 8,600,159 B2 | | 12/2013 | Greenebaum et al. | |
| 2009/0073168 A1 | * | 3/2009 | Jiao | ........................ G06T 15/005 345/426 |
| 2012/0179833 A1 | * | 7/2012 | Kenrick | ......... H04N 21/234309 709/231 |
| 2012/0268470 A1 | * | 10/2012 | Duca | ..................... G06T 11/206 345/522 |
| 2014/0267318 A1 | * | 9/2014 | Lum | ..................... G06T 15/005 345/506 |
| 2016/0132987 A1 | * | 5/2016 | Li | ............................. G06T 1/20 345/522 |

* cited by examiner

*Primary Examiner* — Joni Richer
(74) *Attorney, Agent, or Firm* — Baker & Hostetler LLP

(57) ABSTRACT

The present disclosure describes techniques for removing unnecessary processing stages from a graphics processing pipeline based on the format of data passed between the stages. Starting with a stage at a middle point in a pipeline, formats of data that are input to and output from the middle stage may be compared to each other. If the formats match, the middle stage may be removed from the pipeline. Thereafter, the format of data input to a pair of middle stages of the pipeline and output from the pipeline may be compared and, if they match, the middle pair may be deleted. This process may repeat until a middle pair is found where no match occurs between the input and output format. The remaining stages of the pipeline may be retained. In cases where a pipeline is not symmetrical, the formats of data at each node may be compared to each other. If a node possesses a format that does not match the format of any other node, then the stages between the node and its closest endpoint in the pipeline may be retained.

29 Claims, 7 Drawing Sheets

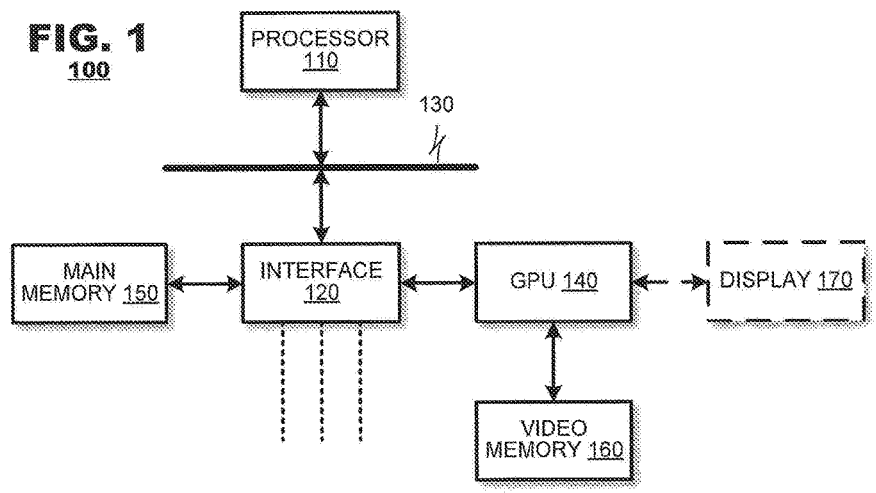

300

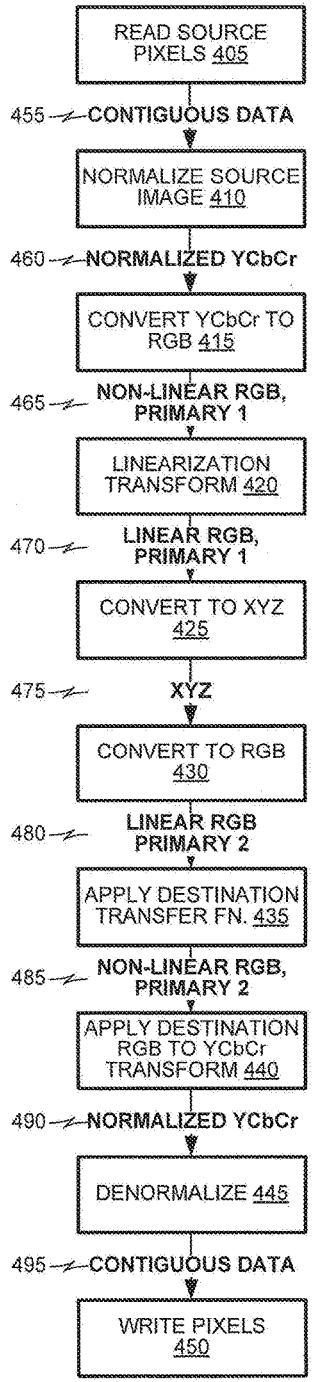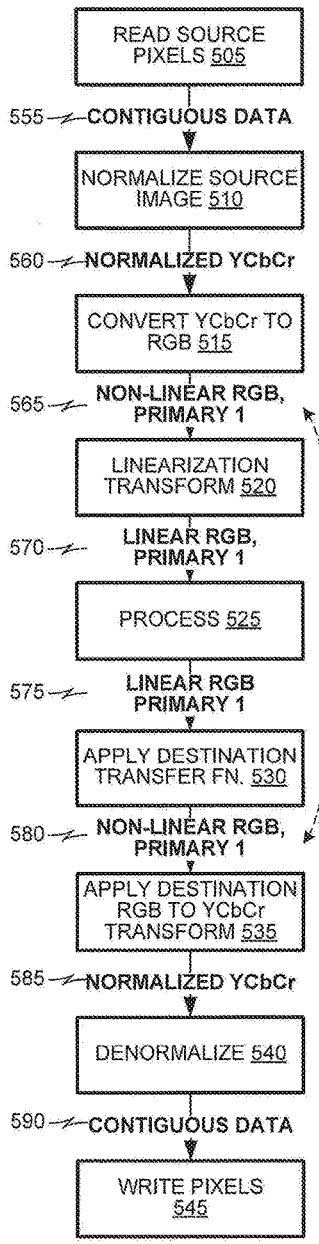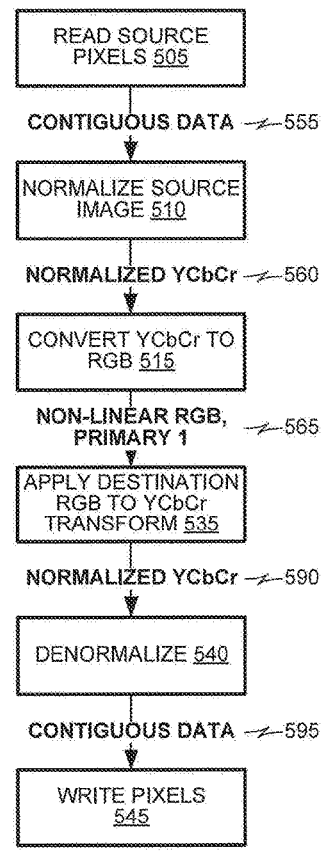
FIG. 4
400
FIG. 5A
FIG. 5B
500

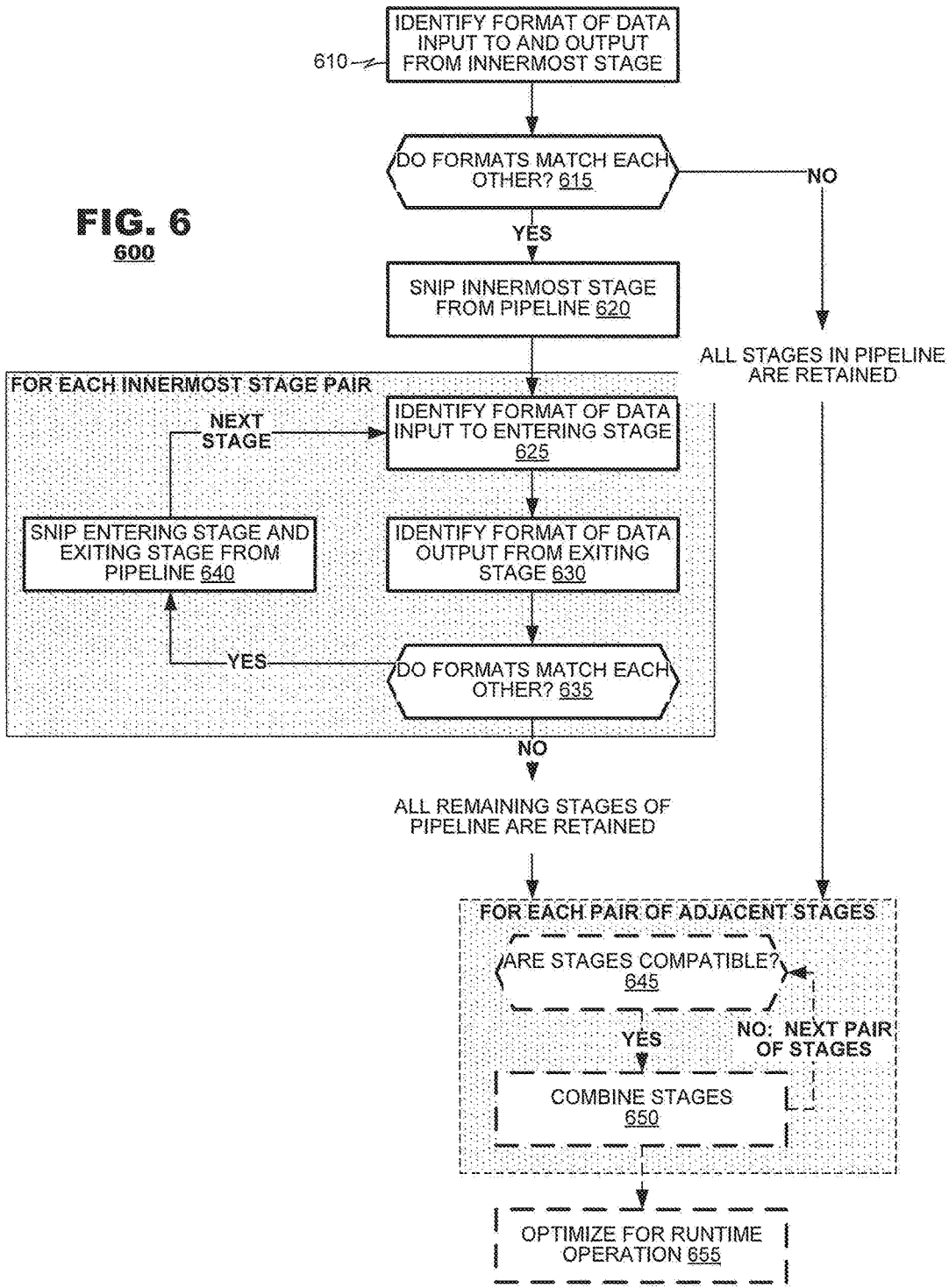

700

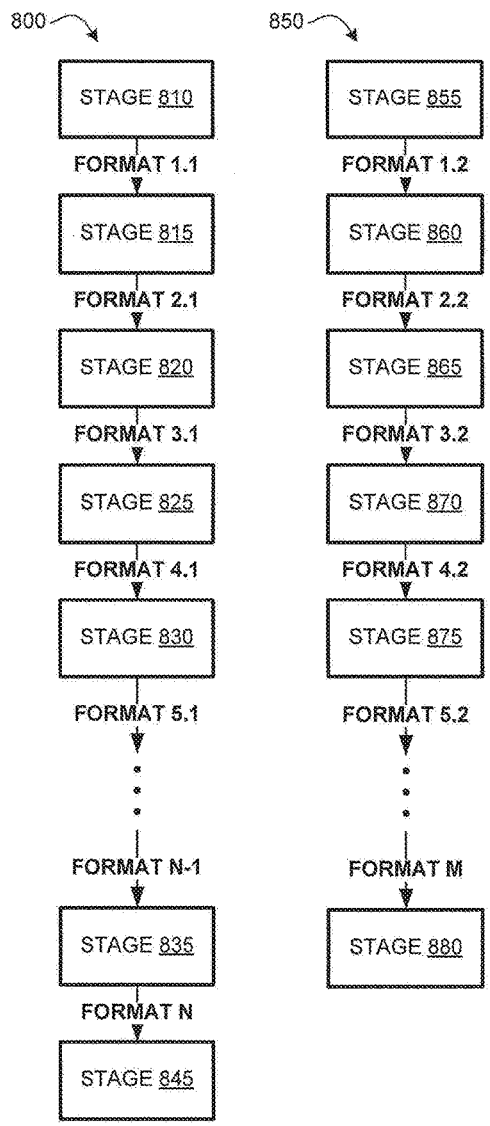
FIG. 8A
FIG. 8B
800
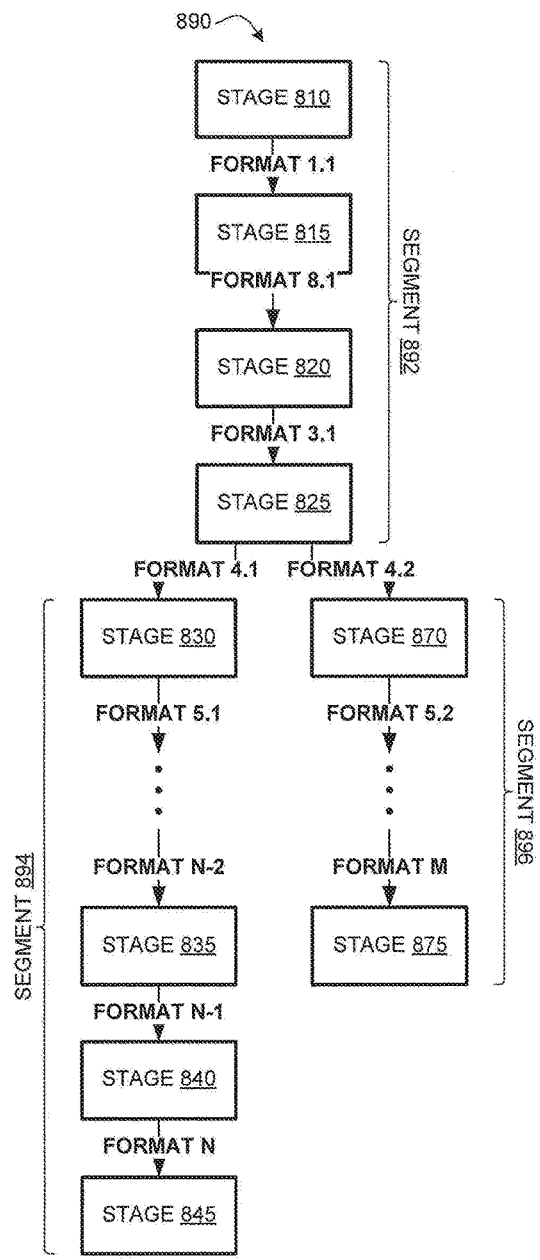
FIG. 8C

900

TECHNIQUES TO DERIVE EFFICIENT CONVERSION AND/OR COLOR CORRECTION OF VIDEO DATA

BACKGROUND

The present disclosure is directed to management of graphics processes in a computer system.

In computer systems, different parts of a system may require different representations of a common graphical asset, such as a video frame. Accordingly, graphics processing units possess systems to convert such assets among different possible representations. Operation of the graphics processing units can be defined flexibly according to a rendering pipeline, which defines the different conversion processes that will be invoked to convert the asset from one representation to another. The rendering pipeline often is described in a shader program which is compiled for execution by a GPU.

Execution of the rendering pipeline consumes computing resources. First, execution of each stage of the pipeline consumes processing resources. Moreover, data that is generated by one stage of the pipeline typically is buffered before being consumed by a second stage of the pipeline, which necessitates allocation of memory resources for each stage in the pipeline. And, when rendering pipelines are developed to process video assets rather than still image assets, resource consumption issues grow even further.

The inventors have determined that pipelines often are not defined to contain the minimal number of processing stages that are necessary to convert assets from one representation to another. Accordingly, there is a need in the art to remove unnecessary processing stages from pipelines and, by extension, conserve resources in graphics processing systems.

BRIEF DESCRIPTION OF THE DRAWINGS

FIG. 1 illustrates a computing system suitable for use with the embodiments of the present disclosure.

FIG. 2 is a representation of an exemplary pipeline.

FIGS. 4, 5A, and 5B illustrate other exemplary pipelines.

FIG. 6 illustrates a method according to an embodiment of the present disclosure.

FIGS. 8A, 8B, and 8C illustrate exemplary pipelines.

DETAILED DESCRIPTION

Figure 3:
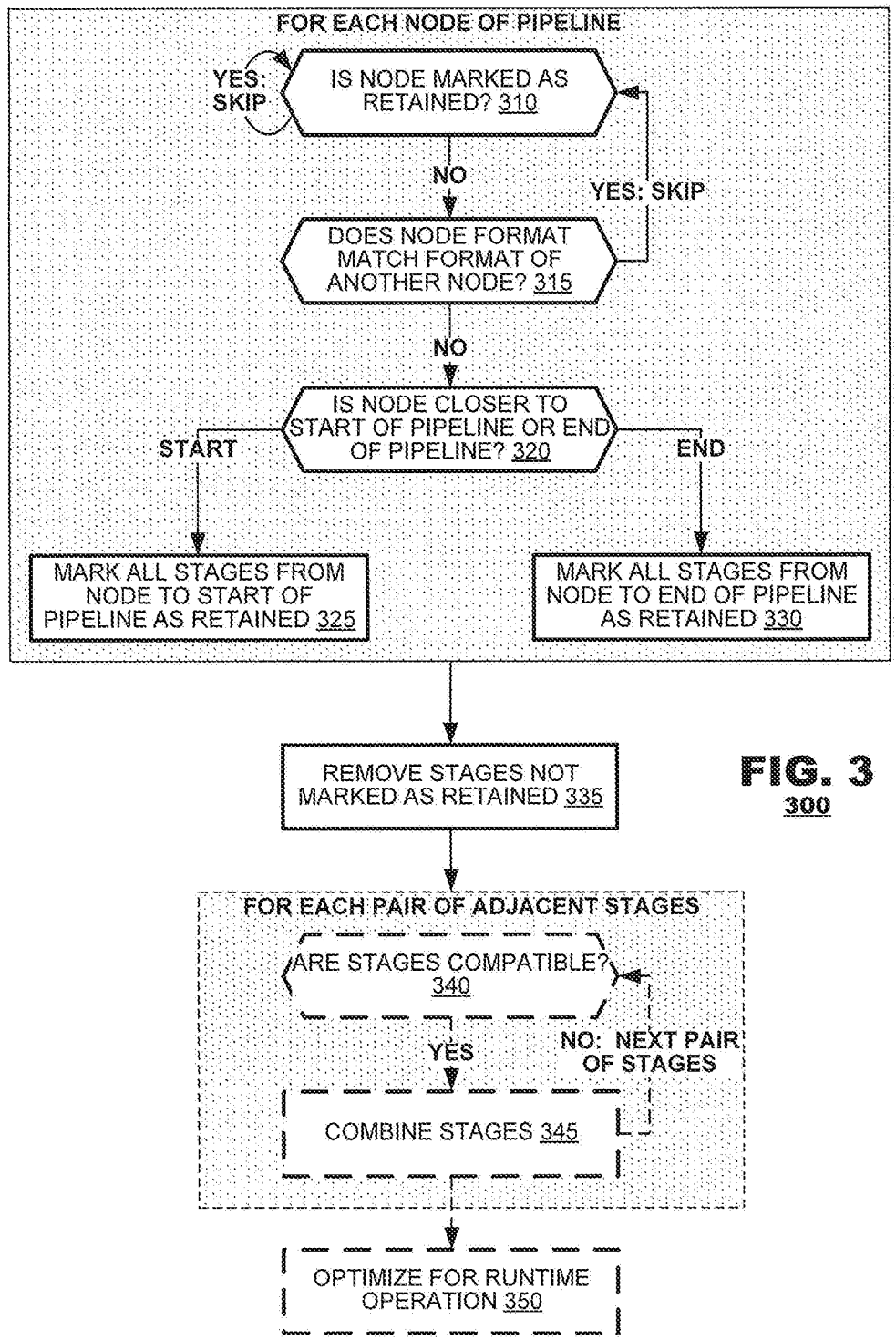
FIG. 3 illustrates a method according to an embodiment of the present disclosure.

Embodiments of the present disclosure provide techniques for removing unnecessary processing stages from a graphics processing pipeline based on the format of data passed between the stages. Starting with a stage at a middle point in a pipeline, formats of data that are input to and output from the middle stage may be compared to each other. If the formats match, the middle stage may be removed from the pipeline. Thereafter, the format of data input to a pair of middle stages of the pipeline and output from the pipeline may be compared and, if they match, the middle pair may be deleted. This process may repeat until a middle pair is found where no match occurs between the input and output format. The remaining stages of the pipeline may be retained. In cases where a pipeline is not symmetrical, the formats of data at each node may be compared to each other. If a node possesses a format that does not match the format of any other node, then the stages between the node and its closest endpoint in the pipeline may be retained.

FIG. 1 illustrates a computing system 100 suitable for use with the embodiments of the present disclosure. The system 100 may include a processor 100 and memory interface 120 provided in communication by a bus 130. The interface 120 may provide a communication interface to other system components, such as a graphics processing unit ("GPU") 140 and a main memory 150 of the system. The GPU 140 may have access to its own memory system 160 (called, a "video memory" for convenience), which may be a dedicate memory space within the main memory 150 or may be a memory system separate from the main memory 160.

During operation, the processor 110 may execute various program instructions that are stored in the main memory 150. These program instructions may define an operating system and/or applications of the system 100. As part of its program execution, the processor 110 may issue requests to the GPU 140 to perform graphics operations that will generate images for output to a display. The processor 110 and/or the GPU 140 may define a pipeline of graphics processes to perform the requested operation, and may allocate space in the main memory 150, the video memory 160 or both to store data at each stage of the pipeline.

FIG. 2 is a representation of an exemplary pipeline 200 that may be defined pursuant to a GPU request. In FIG. 2 the pipeline 200 may include a plurality of pipeline stages 210-280 that represents a respective graphics operation. The GPU may allocate memory spaces for the graphics data output by the respective stages, which are illustrated as nodes between the stages in FIG. 2. Thus, a GPU may allocate N memory spaces for the N nodes extending between stages 210-280. The pipeline 200 may define formats of the data at each node. For example, one stage may transform data from an YCbCr representation to an RGB representation. For this stage, the pipeline may define the input data format as YCbCr (indeed, since there are several YCbCr representations, the pipeline may identify the specific representation at work at the pipeline stages) and it may define the output data format as RGB. A subsequent stage may transform the RGB representation from a non-linear representation to a linear representation. Here, too, the pipeline 200 may have input data formats and output data formats defined for the stage. Such format definitions may be provided for each stage 210, 220, . . . , 280 of the pipeline 200.

FIG. 3 illustrates a method 300 according to an embodiment of the present disclosure. The method 300 may operate on a pipeline definition to determine whether pipeline stages may be deleted from the pipeline prior to execution. If stages can be deleted, then processing resources that might have otherwise been allocated to execution of the stages can be conserved.

The method 300 may review the data formats defined at interstitial nodes between stages of the pipeline 200. At each node, the method 300 may determine whether the node previously was marked as retained (box 310). If so, the method 300 may advance to another node of the pipeline. If not, the method 300 may determine whether the node's format matches the format at another node (box 315). If so, the method 300 may advance to another node of the pipeline.

If the node has a format that does not match the format of another node in the pipeline, then method 300 may consider that node's position within the pipeline (box 320). If the node is closer to the start of the pipeline, then the method 300 may mark all stages from the node's position to the start of the pipeline as "retained" (box 325). If the node is closer to the end of the pipeline, then the method 300 may mark all stages from the node's position to the end of the pipeline as "retained" (box 330). Once all stages have been considered, various stages of the pipeline will have been marked as retained and others may have not have been so marked. The method 300 may remove from the pipeline any stage that is not marked as retained (box 335). A reduced-sized pipeline may be created which is ready for execution.

In an embodiment, the method 300 may optimize the pipeline by determining whether adjacent stages of the pipeline may be combined. For each pair of adjacent stages, the method may determine whether the pair of stages are compatible (box 340) and, if so, the method 300 may combine them (box 345). Two stages may be considered compatible if an alternate stage may be defined that directly transforms input data presented at the input of a first stage to the output format created at the output of the second stage (essentially, the intermediate node between the two stages can be omitted). For example, if a first stage transformed image data from a first non-linear representation to a linear representation, and a next stage transforms the image data form the linear representation to a second non-linear representation, the two stages may be replaced by a single stage that transforms the image data from the first non-linear representation to the second non-linear representation. Alternatively, after removal of stages, it may occur that a pipeline is generated having two adjacent stages that invert operations of each other—for example, where a first stage converts YCbCr data to RGB and an adjacent stage coverts the RGB data back to the first YCbCr representation. In such a circumstance the stages may be combined into a NOP stage (no operation), which performs no image manipulation.

Optionally, the method 300 may optimize the pipeline for runtime operation (box 350).

In another embodiment, rather than determining whether a node format is unique within a pipeline (box 315), the method 300 may determine whether the format of data at a given node matches the format of data at another node. If so, then all stages between the matching nodes may be deleted (step not shown).

FIG. 4 illustrates an exemplary pipeline 400 on which the method 300 of FIG. 3 may operate. In this example, the pipeline 400 includes ten stages 405-450 that, when executed, performs respective operations on input data. The first stage 405 causes pixel values to be read to the pipeline. In this example, the source pixels may be laid out in memory, with each component of the pixel sequential in memory, or grouped into planes. Each plane may contain only some of the components. The read may re-organize pixel data so they may be processed as contiguous data (node 455).

The second stage 410 may normalize the source data according to its component range. For example, image data for 8-bit YCbCr pixels commonly is restricted to a range from 16 to 235 even though 8-bit data values can extend from a range of 0 to 255; the normalization stage 410 may normalize the data values to occupy the entire range afforded by the image data's bit depth. Thus, stage 410 may output normalized YCbCr data (node 460).

The third stage 415 may convert image data from an YCbCr format to an RGB format. For example, the YCbCr data may be represented according to an ITU-R BT.601 representation or an ITU-R BT.709 representation and converted from that representation to an RGB format. Thus, the output from stage 415 may be in a non-linear RGB representation (node 465).

Stage 420 may perform a linearization transform, generating linear RGB data from the non-linear RGB input (node 470). Stage 425 may perform conversion of RGB data to an XYZ color space (node 475). Stage 430 may perform a second transform from the XYZ format to an RGB format. In conversion from the XYZ format to the RGB format, the pipeline 400 may alter a white point of the image data or perform other processing operations on image content. Thus, the output format of stage 430 (node 480) is illustrated as linear RGB having a primary different ("primary 2") from a primary of the data output from stage 420 ("primary 1").

Stage 435 may apply a destination transfer function, for example, a non-linear transform function on the RGB data. In this example, stage 435 may generate output data that is linear RGB using the second primary (node 485). Stage 440 performs a transform from RGB to YCbCr and outputs data in the YCbCr format (node 490). Stage 445 denormalizes the YCbCr input data to match a component range of a destination format. For example, using the 8-bit YCbCr example above, stage 445 may return the image data to the component range of 16 to 235. In stage 450, data created by the pipeline may be written to memory, where it may be consumed for other uses (e.g., rendering).

As the method of FIG. 3 operates on the pipeline illustrated in FIG. 4, it may consider the formats of data at nodes 455-495 between the individual stages 405-450 and may determine of those formats match formats of other nodes. The method 300 may operate on the nodes 455-495 in order through the pipeline, for example, first (node 455) to last (node 495) or it may operate on nodes working from interior nodes outwardly toward the ends of the pipeline. In practice, it may be efficient to start analysis at an interior node and work outwardly; if the method 300 identifies nodes that have no match elsewhere in the pipeline 400, the method 300 need not analyze other nodes from the identified node's position to an end of the pipeline to determine whether they are retained.

In the example of FIG. 4, an interior node 480 has a format (linear RGB, primary 2) that does not match the formats any other node position. Accordingly, the method 300 would mark node 480 as retained and also mark the nodes 485-495 between node 480 and the closest endpoint of the pipeline 400 (stage 450) as retained. The stages 440-450 therefore would be retained in the pipeline 400.

Continuing with this example, although the nodes 455-460 are illustrated as having formats that match formats of nodes 490-495, in practice the formats will contain differences. For example, the normalized YCbCr data at the two nodes 460, 490 will differ, owing to their relationships with the different primaries in the RGB domain. According, the method 300 will not identify these nodes as matching each other.

FIG. 5 illustrates an exemplary pipeline 500 on which the method 300 of FIG. 3 may operate. In this example, the pipeline 500 includes nine stages 505-545 that, when executed, performs respective operations on input data. The first stage 505 causes pixel values to be read to the pipeline. In this example, the source pixels may be laid out in memory, with each component of the pixel sequential in memory, or grouped into planes. Each plane may contain only some of the components. The read may re-organize pixel data so they may be processed as contiguous data (node 555).

The second stage 510 may normalize the source data according to its component range. As described earlier, in certain formats of image data, data values may be restricted to a range from that is less than the full range afforded by the data's bit depth; the scaling stage 515 may normalize the data values to occupy the entire range afforded by the bit depth. In this example, stage 510 may output normalized YCbCr data (node 560). In this example, the YCbCr data may be represented according to an ITU-R BT.709 representation.

The third stage 515 may convert image data from the YCbCr format to an RGB format. The state may convert the ITU-R BT.709 representation YCbCr data to the RGB format. Thus, the output from stage 515 may be in a non-linear RGB representation (node 565).

Stage 520 may perform a linearization transform, generating linear RGB data from the non-linear RGB input (node 570). Stage 525 may perform an intermediate process operation that does not convert format of the input data. Thus, the output data (node 575) also may be RGB data with a primary that matches a primary at node 570.

Stage 530 may apply a destination transfer function, for example, a non-linear transform function on the RGB data. In this example, stage 535 may generate output data that is non-linear RGB using the same primary (node 580).

Stage 535 may performs a transform from RGB to YCbCr and outputs data in the YCbCr format (node 585). In this example, the YCbCr data may be represented according to an ITU-R BT.601 representation.

Stage 540 may return the YCbCr input data to match a component range of a destination format (node 590). For example, using the 8-bit YCbCr example above, stage 540 may return the image data to the component range of 16 to 235. In stage 545, data created by the pipeline may be written to memory, where it may be consumed for other uses (e.g., rendering).

As the method of FIG. 3 operates on the pipeline illustrated in FIG. 5(a), it may consider the formats of data at nodes 555-590 between the individual stages 505-545 and may determine of those formats match formats of other nodes. Here again, the method 300 may operate on the nodes 555-590 in order through the pipeline, for example, first (node 555) to last (node 590) or it may operate on nodes working from interior nodes outwardly toward the ends of the pipeline 500.

In the example of FIG. 5(a), nodes 565 and 580 have matching formats, and nodes 570 and 575 having matching formats. Node 560 has a format that does not match any other node in the pipeline 500, however, and ultimately stages 505-510 will be marked as retained. Stages 520-530, however, may be removed from the pipeline 500 because the formats of nodes 570 and 580 match each other and no other node will be found between them that fails to match the format of another node. Thus, the pipeline 500 may be altered to remove stage 530 as shown in FIG. 5(b).

Returning to FIG. 3, in an embodiment, following operation of boxes 310-345 to determine whether pipelines may be modified either to eliminate or to alter redundant stages, the method 300 may optimize a pipeline for runtime operation (box 350). Optimization may involve a comparison of stages resident in a pipeline against processing systems available in the processing system (e.g., the GPU) that will execute the pipeline. For example, it may occur that a GPU possesses functional units that are provisioned to execute processes represented by a portion of a given pipeline. Using the pipeline of FIG. 4 as an example, a GPU may possess a functional unit that is provisioned to execute stages 405-420 of the pipeline 400. In this instance, the method may replace the stages 405-420 with a single stage (not shown), which invokes the functional unit. As another example, a GPU may possess a functional unit that matches input/output formats of a single stage of a pipeline but which operates with improved performance (ex., it is faster than the designated stage); in this instance, the method 300 may replace the designated stage of the pipeline with a replacement stage that invokes the functional unit.

FIG. 6 illustrates a method 600 according to an embodiment of the present disclosure. The method 600 may work from an innermost stage of a pipeline outwardly through pipeline stages. The method 600 may begin by identifying a format of data input to and output from an innermost stage in the pipeline (box 610) and determining whether those formats match each other (box 615). If the formats do not match, then all stages of the pipeline must be retained and the method 600 may end.

If the formats of data input to and output from the innermost stage match, then the innermost stage may be snipped from the pipeline (box 620). The method 600 may work iteratively through other stages of the pipeline. The method 600 may examine a pair of stages at a middle location of the pipeline and identify the format of data input to an entering stage of the innermost pair (box 625) and the format of data output from an existing stage of the innermost pair (box 630). The method 600 may determine if those formats match each other (box 635). If the formats match, then the innermost stage pair may be snipped from the pipeline (box 640) and the operation of boxes 625-640 may repeat using a new innermost pair of stages. If, however, formats of stages are determined not to match each other at box 635, then all remaining stages of the pipeline are retained.

In an embodiment, the method 300 may optimize the pipeline by determining whether adjacent stages of the pipeline may be combined. For each pair of adjacent stages, the method may determine whether the pair of stages are compatible (box 645) and, if so, the method 300 may combine them (box 650). As in the embodiment of FIG. 3, two stages may be considered compatible if an alternate stage may be defined that directly transforms input data presented at the input of a first stage to the output format created at the output of the second stage (essentially, the intermediate node between the two stages can be omitted).

Optionally, the method 600 may optimize the pipeline for runtime operation (box 655) by comparing stages of the pipeline to processing systems of the device that will execute the pipeline.

Figure 7:
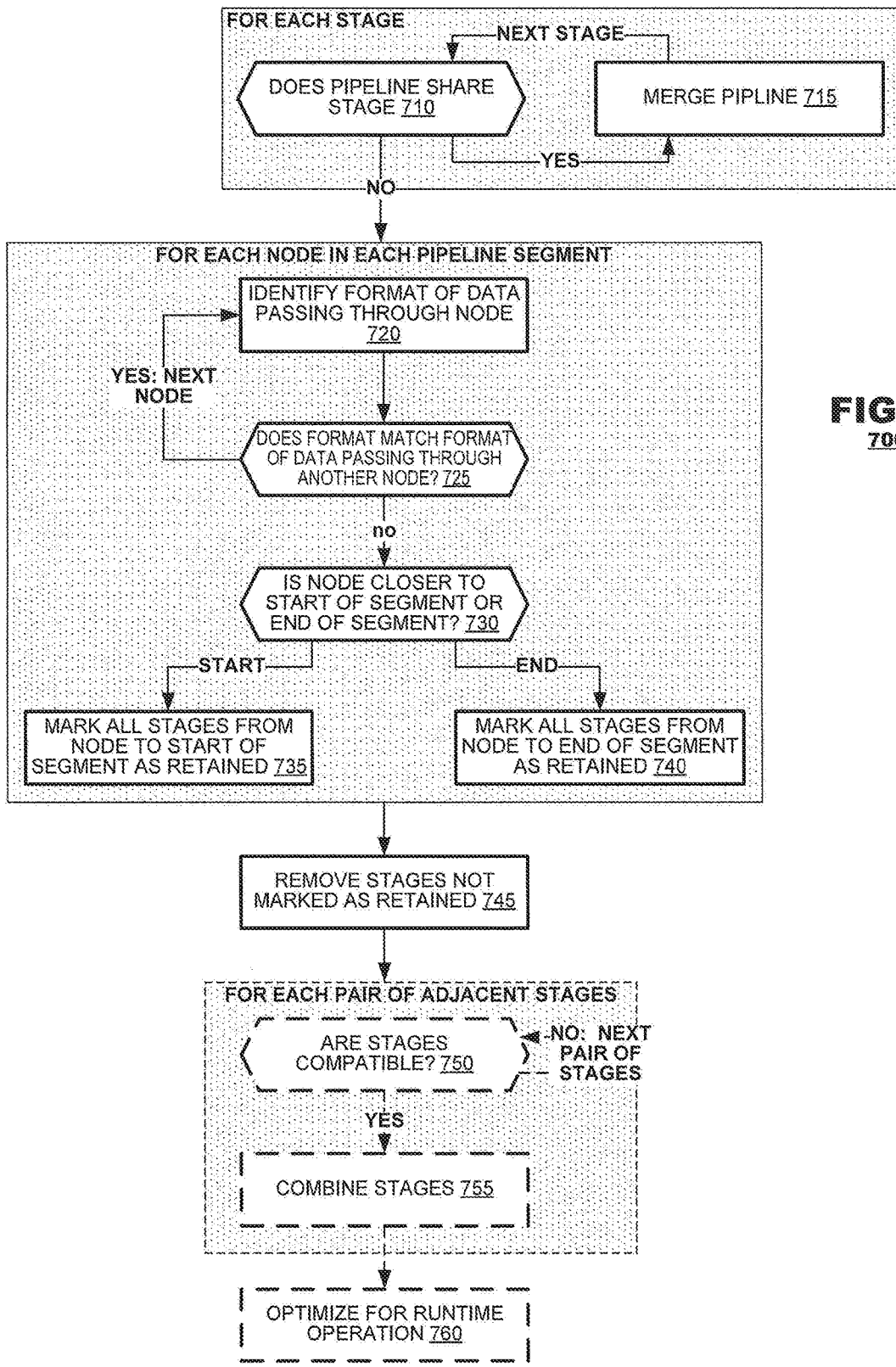
FIG. 7 illustrates a method according to another embodiment of the present disclosure.
Figure 9:
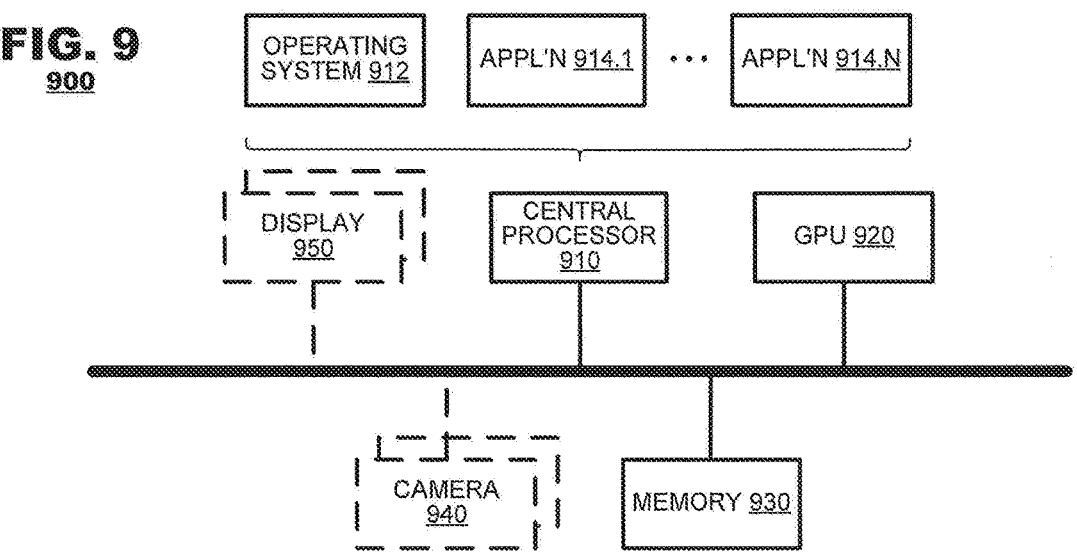
FIG. 9 illustrates an exemplary computing system.

FIG. 7 illustrates a method 700 according to another embodiment of the present disclosure, which accommodates merger of multiple pipelines. The method 700 may begin with a stage-by-stage analysis of the pipelines to determine, at each stage position, whether the stages are the same (box 710). If the stages are the same, the pipelines may be merged at the stage position (box 715) and the method 700 may advance to the next stage. Once a stage position is encountered where the stages of the pipelines are not the same, then the operation of boxes 710-715 may terminate.

The method 700 thereafter may consider each segment of the merged pipeline and determine whether stages may be deleted from the respective segment. Within each segment, the method 700 may identify the format of data at each node between stages (box 720) and determine whether the node's format matches the format of another node in the segment (box 725). If so, the method 700 returns to box 720 to consider another node in the pipeline.

If the node has a format that does not match the format of another node in the segment, then method 700 may consider that node's position within the segment (box 730). If the node is closer to the start of the segment, then the method 700 may mark all stages from the node's position to the start of the segment as retained (box 735). If the node is closer to the end of the segment, then the method 700 may mark all stages from the node's position to the end of the segment as retained (box 740). Once all stages have been considered, various stages of the segment will have been marked as retained and others may have not have been marked as retained. The method 700 may remove from the segment any stage that is not marked as retained (box 745). A reduced-sized segment may be created which is ready for execution.

In an embodiment, the method 700 may optimize the pipeline by determining whether adjacent stages of the pipeline may be combined. For each pair of adjacent stages, the method may determine whether the pair of stages are compatible (box 750) and, if so, the method 700 may combine them (box 755). As in the embodiment of FIGS. 3 and 6, two stages may be considered compatible if an alternate stage may be defined that directly transforms input data presented at the input of a first stage to the output format created at the output of the second stage (essentially, the intermediate node between the two stages can be omitted).

Optionally, the method 700 may optimize the pipeline for runtime operation (box 760) by comparing stages of the pipeline to processing systems of the device that will execute the pipeline.

As illustrated in FIG. 7, the operation of boxes 720-745 utilize techniques of FIG. 3, boxes 310-335, to determine whether to remove stages from a pipeline segment. Alternatively, the techniques of FIG. 6, boxes 610-640 may be used.

FIG. 8 illustrates exemplary pipelines 800, 850 on which the method of FIG. 7 may operate. The first pipeline 800 may include a first set of stages 810-845 and the second pipeline 850 may include a second set of stages 855-880. The method 700 may analyze the stages of the two pipelines 800, 850 in order and determine whether the stages are the same. In the example illustrated in FIG. 8, stages 810-825 of the first pipeline 800 may be identified as being the same as stages 855-870 of the second pipeline 850 and they may be merged. Stage 830 of the first pipeline 800 and stage 875 of the second pipeline 850 may be identified as different from each other. The method 700 therefore may generate a new pipeline definition (pipeline 890) that includes a first segment 892 that includes stages 810-825, a second segment 894 that includes stages 830-845 and a third segment 896 that includes stages 870-875.

Once the merged segment 890 is identified, the method 700 may determine whether stages may be removed from the segments 892, 894, 896. As indicated, the techniques of FIG. 3 and/or FIG. 6 may be applied to the respective segments. Removal of stages is not shown in FIG. 8.

Several embodiments of the disclosure are specifically illustrated and/or described herein. However, it will be appreciated that the teachings of this the disclosure may find application in other implementations without departing from the spirit and intended scope of the disclosure.

We claim:

1. A method, comprising:
    starting with a middle stage of a graphics processing pipeline, comparing format of data input to the middle stage to format of data output from the middle stage,
    if the input and output formats match, removing the middle stage from the pipeline;
    iteratively:
        comparing format of data input to a first of a middle pair of stages to format of data output from a second of the middle pair of stages, and
        if the input and output formats of the middle pair of stages match, removing the middle pair of stages from the pipeline;
    defining a new pipeline from the stages remaining in the pipeline when the first or second comparing indicates no match.

2. The method of claim 1, wherein the removing deletes the matching stages from the new pipeline.

3. The method of claim 1, wherein the removing replaces the matching stages with a NOP (no operation) stage.

4. The method of claim 1, further comprising, from the new pipeline:
    identifying adjacent stages in the new pipeline that are compatible with each other; and
    replacing the compatible stages in the new pipeline with an alternative processing stage that matches an input format of a first of the adjacent stages and that matches an output format of a last of the adjacent stages.

5. The method of claim 1, further comprising replacing a stage of the pipeline with an alternative stage.

6. The method of claim 1, further comprising executing the new pipeline by a graphics processor.

7. A method, comprising:
    comparing stages of a plurality of graphics processing pipelines,
    when stages at beginning positions of the pipelines match each other, merging beginnings of the pipelines stage-by-stage until the stages do not match each other,
    thereafter, for each segment of the merged pipeline:
        starting with a middle stage of the respective segment, comparing a format of data input to the middle stage to a format of data output from the middle stage,
        if the input and output formats match, removing the middle stage from the respective segment;
        iteratively:
            comparing format of data input to a first of a middle pair of stages to format of data output from a second of the middle pair of stages, and
            if the input and output formats of the middle pair of stages match, removing the middle pair of stages from the respective segment;
    defining a new pipeline from the stages remaining in the respective segments when the respective first or second comparing indicates no match.

8. The method of claim 7, wherein the removing deletes the matching stages from the new pipeline.

9. The method of claim 7, wherein the removing replaces the matching stages with a NOP (no operation) stage.

10. The method of claim 7, further comprising, for each segment of the new pipeline:
    identifying adjacent stages in the respective segment that are compatible with each other; and
    replacing the compatible stages in the new pipeline with an alternative processing stage that matches an input format of a first of the adjacent stages and that matches an output format of a last of the adjacent stages.

11. The method of claim 7, further comprising replacing a stage of the pipeline with an alternative stage.

12. The method of claim 7, further comprising executing the new pipeline by a graphics processor.

13. A non-transitory computer readable medium storing instructions that, when executed by a processing device, causes the device to:

starting with a middle stage of a graphics processing pipeline, compare format of data input to the middle stage to format of data output from the middle stage, if the input and output formats match, remove the middle stage from the pipeline;

iteratively:
compare format of data input to a first of a middle pair of stages to format of data output from a second of the middle pair of stages, and if the input and output formats of the middle pair of stages match, remove the middle pair of stages from the pipeline;

define a new pipeline from the stages remaining in the pipeline when the first or second comparison indicates no match.

14. A method, comprising:
comparing formats of pixel data passed between stages of a graphics processing pipeline, for each node between a pair of stages:
determining whether a format of pixel data at the node matches a format of pixel data at another node in the pipeline,
if the node has a format that matches the format of another node in the pipeline, removing from the pipeline stages between the matching nodes; and
defining a new pipeline from the stages that are not removed.

15. The method of claim 14, wherein the removing deletes the matching stages from the new pipeline.

16. The method of claim 14, wherein the removing replaces the matching stages with a NOP (no operation) stage.

17. The method of claim 14, further comprising, from the new pipeline:
identifying adjacent stages in the new pipeline that are compatible with each other; and
replacing the compatible stages in the new pipeline with an alternative processing stage that matches an input format of a first of the adjacent stages and that matches an output format of a last of the adjacent stages.

18. The method of claim 14, further comprising replacing a stage of the pipeline with an alternative stage.

19. The method of claim 18, wherein, when an innermost node of the pipeline has a format that does not occur elsewhere in the pipeline, all stages of the pipeline are retained.

20. The method of claim 14, wherein the method begins analysis of an interior node of the pipeline and works outwardly toward ends of the pipeline.

21. The method of claim 14, wherein the method begins analysis of a first node at a beginning of the pipeline and works node-by-node toward an end of the pipeline.

22. The method of claim 14, further comprising executing the new pipeline by a graphics processor.

23. A method, comprising:
comparing stages of a plurality of graphics processing pipelines,
when stages at beginning positions of the pipelines match each other, merging beginnings of the pipelines stage-by-stage until the stages do not match each other,
thereafter, for each segment of the merged pipeline:
comparing formats of pixel data passed between stages of the respective segment, for each node between a pair of stages:
determining whether a format of pixel data at the node matches a format of pixel data at another node in the segment,
if the node has a format that matches the format of another node in the segment, removing from the segment stages between the matching nodes; and
defining a new pipeline from the stages that are not removed.

24. The method of claim 23, wherein the removing deletes the matching stages from the new segment.

25. The method of claim 23, wherein the removing replaces the matching stages with a NOP (no operation) stage.

26. The method of claim 23, further comprising, for each segment of the new pipeline:
identifying adjacent stages in the respective segment that are compatible with each other; and
replacing the compatible stages in the new pipeline with an alternative processing stage that matches an input format of a first of the adjacent stages and that matches an output format of a last of the adjacent stages.

27. The method of claim 23, further comprising replacing a stage of the pipeline with an alternative stage.

28. The method of claim 23, further comprising executing the new pipeline by a graphics processor.

29. A non-transitory computer readable medium storing instructions that, when executed by a processing device, causes the device to:
compare formats of pixel data passed between stages of a graphics processing pipeline, for each node between a pair of stages:
determine whether a format of pixel data at the node matches a format of pixel data at another node in the pipeline,
if the node has a format that matches the format of another node in the pipeline, remove from the pipeline stages between the matching nodes; and
define a new pipeline from the stages that are not removed.

* * * * *